Edmund Barany
Melvin Sackter
INVENTORS
BY [signatures]
ATTORNEYS

Edmund Barany
Melvin Sackter
INVENTORS.
BY [signature]
[signature]
ATTORNEYS

Patented Nov. 11, 1952

2,617,890

UNITED STATES PATENT OFFICE 2,617,890

ERASING MAGNET ASSEMBLY FOR MAGNETIC RECORDING AND REPRODUCING INSTRUMENTS

Edmund Barany, Chicago, and Melvin Sackter, Arlington Heights, Ill., assignors to Ampro Corporation, Chicago, Ill., a corporation of Illinois Application November 9, 1950, Serial No. 194,916

6 Claims. (Cl. 179—100.2)

The present invention relates to erasing magnet assemblies for magnetic recording instruments designed for use with traveling elongate record bodies of magnetizable material, and especially to such an assembly that employs a permanent magnet through the field of which the record is passed as it travels to the recording head, for purposes of eliminating any previous recording or stray magnetization that the record body may have acquired, and also brings the body as closely as practical to a completely demagnetized condition.

For limiting cost of magnetic recording instruments this erasing and conditioning preferably is accomplished by a permanent magnet supported alongside the record body path and relative to which the record body is guided for correct demagnetizing action by the magnet field. In a low cost instrument that is designed for selective use as a recording and reproducing instrument, and wherein the record body travels in substantially the same path for both recording and reproduction by the same magnetic head it is necessary to provide means for eliminating the effect of the erasing magnet on the record body during reproduction. It is highly desirable for this elimination of erasing effectiveness to automatically accompany establishment of the reproducing condition of the instrument and that restoration of erasing effectiveness be automatically accomplished upon conversion of the instrument to its recording condition.

As set forth in the co-pending application for U. S. Patent of Edmund Barany, Harold W. Bauman and Melvin Sackter, Serial No. 194,917, filed November 9, 1950, it is desirable to accomplish erasing and demagnetizing of an elongate record body of magnetizable material prior to recording on such body, by first passing the body through a magnetic field region adjacent one pole of the magnet and of an intensity sufficient to magnetize the record body to saturation and then to pass the body through a second field region adjacent the second magnet pole and therefore of opposite polarity and of an intensity to completely demagnetize the body. The above identified application discloses means for relatively adjusting a magnet and a record path for accomplishing such erasing and conditioning. As set forth in application for U. S. Patent of Harold W. Bauman, Serial No. 194,914, filed November 9, 1950, it is desirable, in order to insure proper cooperation between an elongate flexible body of magnetizable material and the erasing magnet of a recording instrument, to provide means for yieldingly pressing such a traveling body against a guide surface of the magnet assembly, and also to make such means retractable for convenient threading of a record between the guide surface and the pressure element. The present invention is herein disclosed as embodied in an instrument having arrangements disclosed by both above-identified applications.

A primary object of the invention is the provision of a novel semi-automatic device for magnetic recording and reproducing instruments for rendering a permanent magnet erasing assembly non-effective during reproduction by the instrument.

Another object is the provision of a novel assembly of magnetic erasing means having a record body-guiding surface with an auxiliary record body guide device that is selectively operable to establish a record body path outside the region of erasing effectiveness of the erasing magnet.

Another object is the provision of such an auxiliary guide device that cooperates with a yielding pressure-exerting body that is effective to press a record body against the guide surface of either the erasing assembly or the auxiliary guide device.

Still another object is the provision of novel operating mechanism for such an auxiliary guide device that is actuable by a rotatable selector shaft and is arranged to accomplish sure and proper operation of the auxiliary guide device as the selector shaft is moved between two angular positions.

Figure 1:
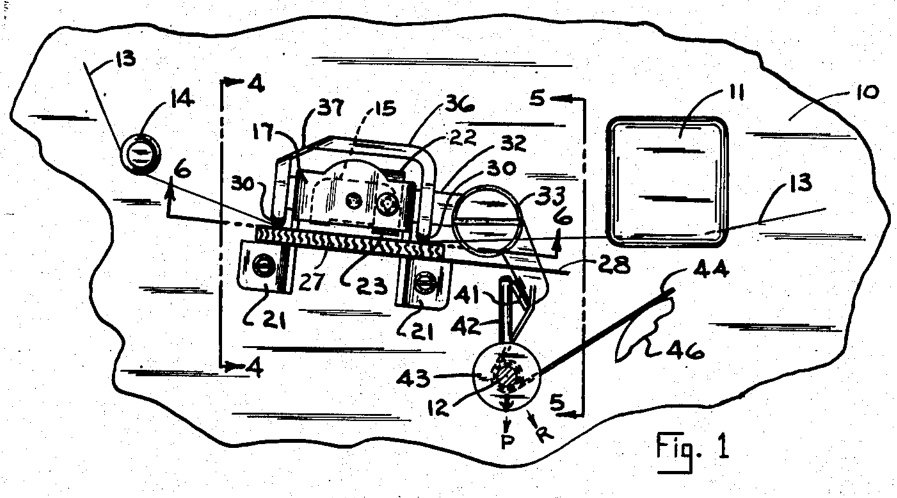
Fig. 1 is a plan of a portion of a magnetic recording and reproducing instrument including a magnetic erasing and conditioning assembly arranged according to the invention and showing such assembly in condition for recording.

Describing the drawings in detail, a magnetic recording and reproducing instrument is provided with a cover plate 10 on which is mounted a recording and reproducing head 11, shown somewhat schematically. A selector shaft 12 projects at right angles from plate 10 and is rotatable between predetermined angularly spaced positions, respectively indicated by letters "P" and "R" to convert electronic circuit means of the instrument between conditions respectively for magnetic reproduction from, and recording on an elongate flexible record body 13, such as a tape of well known form. A record guide pin 14 may also be mounted on plate 10.

On the approach side of head 11 and spaced therefrom is the erasing assembly forming the present invention, and comprising an erasing magnet, a mounting therefore and means for selectively permitting the record body to pass through a region of the field of the magnet that is effective to accomplish magnetic erasing on such body, or guiding the record body in a path extended outside the region of erasing effectiveness of the magnet.

Figure 6:
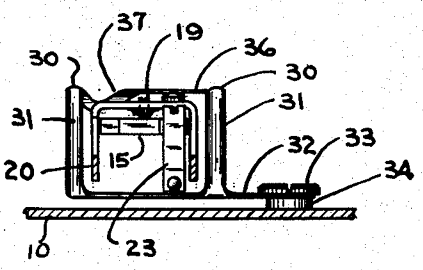
Fig. 6 is a front elevation of the assembly, as indicated by line 6—6 of Fig. 1.

The mounting for the magnet advantageously, though not necessarily, comprises the arrangement disclosed and claimed in the above-identified application for U. S. patent, Serial No. 194,917. Such arrangement comprises a permanent magnet 15, best seen in Figs. 2 and 6. A bracket, supporting the magnet in properly spaced relation to cover plate 10 for registration with a record body 13 traveling in cooperative relation to head 11, comprises a pair of legs 16 spaced in the general direction of record travel and connected by a cross reach 17. Legs 16 have intermediate offset portions, shown as tongues 18, providing magnet-contacting and supporting surfaces that are spaced from cross reach 17. Magnet 15 is clamped against these surfaces by a screw 19 that is threaded through cross reach 17. Legs 16 are supported by bracket reaches 20 that are extended across and under the path of record bodies in outwardly spaced relation to cover plate 10, providing a clear space under the magnet and between the surface of the cover plate and the innermost surfaces of the bracket legs 16 and bracket reaches 20. At the opposite side of the record body path bracket reaches 20 are provided with securing feet portions 21 attached to the cover plate. The bracket cross reach 17 supports a rectangular frame having a top part 22 extended across reach 17 and a part 23 angularly related to part 22 that provides a front surface for guiding contact with a record body, as seen in Fig. 2, to space the latter from a trailing pole piece surface 24 of magnet 15, thereby to so space the record body from the pole piece surface that it passes through a field region of proper intensity to just demagnetize the record after passing sufficiently close to the leading pole piece surface 25 to be magnetized to saturation.

Figure 3:
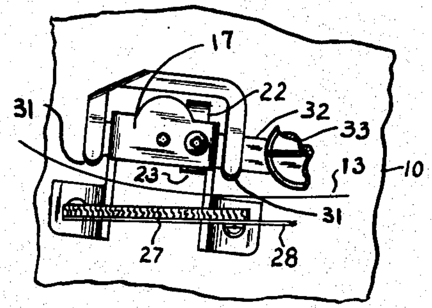
Fig. 3 is a partial plan similar to Fig. 1, showing the assembly in a condition for threading.
Figure 4:
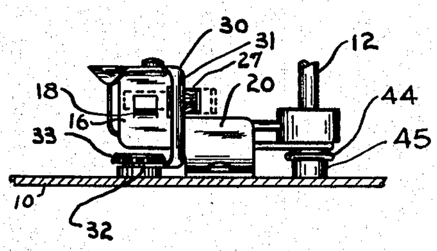
Fig. 4 is a side elevation of the assembly from the entrance or leading side, as indicated by line 4—4 of Fig. 1.
Figure 5:
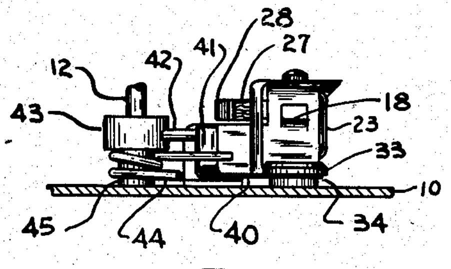
Fig. 5 is a side elevation of the assembly from the exit or trailing side, as indicated by the line 5—5 of Fig. 1.

The erasing assembly includes a pressure pad 27, preferably of slightly yielding material such as felt, that is yieldingly urged toward the magnet pole piece surfaces 24, 25 to maintain a record body close to magnet surface 25 and against the guide surface 23. As disclosed by application Serial No. 194,917, the pad 27 may be carried by a flexible and resilient strip 28, and the latter may be supported at a remote location for swinging from a position in which it urges the pad to exert force against opposed surfaces of the erasing assembly, to a position such as is shown in Fig. 3 and indicated in dotted lines in Fig. 4, wherein the pad is spaced to the opposite side of the record body path from the record-contacting surfaces of the bracket assembly sufficiently to permit ready insertion of a record body between such surfaces and the pad.

Figure 2:
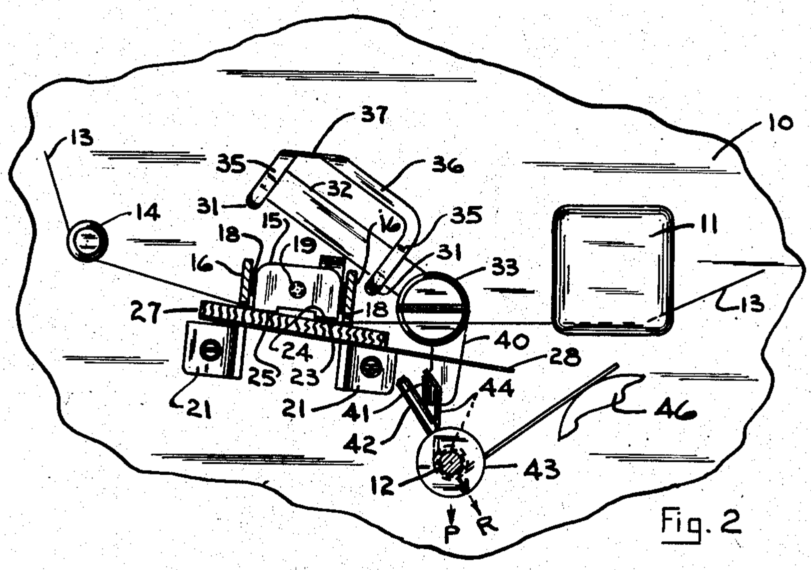
Fig. 2 is a similar plan showing the assembly in condition for reproduction, part of the erasing assembly being broken to disclose details of an erasing permanent magnet and its mounting.

For rendering the magnet ineffective to accomplish erasing on a record body during reproduction from the latter, a structure is provided with record body-contacting means selectively positionable to either permit a record body to travel in the erasing path of Fig. 2, or to constrain the record body to a reproduction path that is spaced from the pole piece magnet surfaces 24, 25 sufficiently to be beyond the region of erasing effectiveness of the magnet, such reproduction path being shown in Fig. 1. The structure in question comprises a pair of members 30 disposed generally at right angles to cover plate 10 and extended across and between the inner and outer boundaries of the record path. Members 30 have front record body-contacting surfaces 31, and the members are supported for opposite movement of the record body-contacting surfaces 31 across the record body path between a retracted position on the same side of the path as magnet 15, shown in Fig. 2, and advanced positions on the opposite side of the path shown in Figs. 1 and 3. During such movement members 30 pass alongside, and spaced outwardly in the general directions of the record path from bracket legs 16.

The supporting structure for members 30 comprises a flat supporting member 32 that is pivotally mounted on plate 10 by a screw 33 for swinging about an axis disposed perpendicular to the cover plate and spaced from the magnet assembly in the general direction of record body travel. A spacer collar 34 positions member 32 for swinging free of the surface of plate 10 and to enter the clear space under the magnet and between the magnet bracket legs and cover plate. Members 30 may comprise upwardly bent parts of side reaches of a U-shaped projection formed integrally with member 32, the remaining portions 35 of such reaches being bent rearward and connected by the cross reach 36. The latter may be deformed at 37 for killing resilience of the U-shaped structure which might produce objectionable vibration.

Extended in angular relation to supporting member 32, and advantageously formed integral therewith, is an actuating lever arm 40 that extends from mounting screw 33 in the general direction of selector shaft 12. An offbent tab 41 is carried by arm 40 adjacent its end. Tab 41 is engaged between an actuating stud 42 projecting radially from and swingable with a collar 43 secured to selector shaft 17, and a biasing or return spring 44. Spring 44 may have an intermediate portion coiled about structure 45 that mounts shaft 12, one end in contact with tab 41 and the other end bearing against a rigid part 46 of the instrument that projects outward from cover plate 10.

Assuming the mechanism to be in the condition of Fig. 2, the recording position as indicated by coincidence of the arrow applied to shaft 12 with the letter "R," and wherein members 30 are in their retracted positions, and with pad 27 positioned to press a record body against surfaces 25, 33, clockwise rotation of shaft 15 to the "P" or "playback" position, for reproduction, swings stud 42 clockwise for swinging operating lever arm 40 counter-clockwise. This movement of arm 40 swings supporting member 32 counter-clockwise, advancing record body-contacting surfaces 31 across the record body path and forcing pad 27 away from the magnet assembly. If a record body is threaded in the instrument, when this operation occurs the advancing surfaces 31 move it laterally from the erasing path of Fig. 2 to the reproduction path of Fig. 1. Operation by shaft 12 is exactly similar in the event that pad 27 is in the retracted position of Fig. 3. In such case, upon advancing the pad toward the magnet assembly it moves the record body laterally until stopped by contact with the guide surfaces of the assembly or surfaces 31, depending on the position of shaft 12. Upon counterclockwise rotation of shaft 12 from the position of Fig. 1 to that of Fig. 2 spring 44 serves to return the assembly 40, 32, 30 to the position shown in Fig. 2.

From the foregoing, structures and arrangements for practicing the invention will be readily apparent, and it will be readily understood that changes from the specific disclosures herein made may be resorted to without departing from the invention as defined by the claims.

We claim:

1. In a magnetic recording and reproducing instrument; in combination, an erasing assembly including a magnet, presser means arranged to contact one side of an elongate, flexible record body of magnetizable material and to yieldingly urge such a body to a path past said assembly extended through a region wherein the field of said magnet is effective upon such a record body to accomplish magnetic erasing, and a selectively movable element having a surface disposed to contact the opposite side of such a record body and in opposition to said presser means, said element being movable to advance said surface across the path from a retracted position on the same side thereof as said magnet to an advanced position on the opposite side of the path and beyond the region of magnet field effectiveness to accomplish erasing.

2. In a magnetic recording and reproducing instrument, the combination of claim 1, wherein said presser means extends beyond the magnet in a direction in which the record path extends, and wherein said element includes a member movable alongside said magnet and providing said record body-contacting surface.

3. In a magnetic recording and reproducing instrument, the combination of claim 1, wherein said presser member extends beyond said erasing assembly in both directions of record path extent and wherein said element comprises a pair of members movable alongside opposite ends of said assembly and each providing a record body-contacting surface disposed to contact such a record body in opposition to said presser means, said element also comprising a movable member supporting said members and movable to advance and retract them across said record body path.

4. In a magnetic recording and reproducing instrument; the combination of claim 1, wherein said selectively movable element comprises a member pivotally supported for swinging about an axis spaced to one side of said magnet in a direction in which the record body path extends, said member being extended in the direction of said path past said magnet, and a pair of record body-contacting members supported on said pivotally supported member and disposed to opposite sides of said magnet for movement alongside it and across the record body path by swinging of said pivotally supported member.

5. In a magnetic recording and reproducing instrument; the combination of claim 1, wherein said assembly is supported in spaced relation to a cover plate of the instrument and with a clear space between it and the cover plate, and wherein said element comprises a member pivotally supported for swinging in said clear space about an axis extended at right angles to the cover plate and spaced from said assembly in a direction generally parallel to the record body path, and a pair of members projecting from said pivotally mounted member in spaced relation for movement alongside opposite ends of said assembly and being extended substantially at right angles to the cover plate, said projecting members providing record body-contacting surfaces movable across the record body path by swinging of said pivotally supported member.

6. In a magnetic recording and reproducing instrument that includes a cover plate, electronic circuit means convertible between recording and reproducing conditions by rotative movement of a selector shaft extended at right angles to said cover plate, an erasing assembly mounted on and extended from said cover plate and including a magnet supported in spaced relation to said cover plate and a record body guide surface arranged in a region of the field of said magnet that is effective to accomplish erasing on a record body contacting it, and resilient means arranged to yieldingly press a flexible elongate record body of magnetizable material against said guide surface; means actuable by said selector shaft to permit such a record body to be pressed against said surface while said circuit means are in recording condition and to space such a body from said surface and beyond the region of magnetic field erasing effectiveness while said circuit means are in reproducing condition, said means comprising an element pivotally supported on said cover plate for swinging about an axis spaced from said magnet in a direction extended generally parallel to the record body path past said magnet and along a plane extended generally parallel to said cover plate, said member including a supporting portion that extends past said magnet and an actuating lever portion that extends generally in the direction of said selector shaft, a pair of record body-contacting members carried by said supporting portion in spaced relation for moving alongside opposite sides of said magnet in the directions in which said path extends and providing contact surfaces that extend in general right angular relation to the cover plate and across and between the inner and outer margins of said path, said record body-contacting members being movable across said path by swinging of said supporting member between retracted positions on the same side of the path as said magnet and guide surface to advanced positions on the opposite side of said path and beyond the region of erasing effectiveness of the field of said magnet, and eccentric means carried by said selector shaft in disposition for actuating said lever portion to swing said supporting portion for advancing the contacting surfaces of said members across the path as the selector shaft is rotated to convert the circuit means from recording to reproducing condition and to retract them as said shaft is rotated to convert the circuit means to recording condition.

EDMUND BARANY.
MELVIN SACKTER.

REFERENCES CITED

The following references are of record in the file of this patent:

UNITED STATES PATENTS

| Number | Name | Date |
|---|---|---|
| 2,535,486 | Dank | Dec. 26, 1950 |

FOREIGN PATENTS

| Number | Country | Date |
|---|---|---|
| 942,645 | France | Sept. 20, 1948 |